United States Patent Office 3,706,771
Patented Dec. 19, 1972

3,706,771
ALKENYL SULFOSUCCINIC ANHYDRIDES, ACIDS AND SALTS THEREOF
Frank J. Kremers, Dover, N.J., and Michael S. Rhodes, Bronx, N.Y., assignors to Allied Chemical Corporation, New York, N.Y.
No Drawing. Filed July 22, 1969, Ser. No. 843,753
Int. Cl. C07c 57/02
U.S. Cl. 260—346.8     8 Claims

ABSTRACT OF THE DISCLOSURE

Alkenyl sulfosuccinic anhydrides, acids and alkali and amine salts thereof and their preparation by reacting an alkenyl succinic anhydride with sulfur trioxide in an anhydrous solvent reaction medium to form the alkenyl sulfosuccinic anhydride which is converted to the acid or salts by reaction with water or aqueous base solutions. The compounds are useful as surface tension reducing agents, especially adapted for incorporation in acid plating baths.

This invention relates to new alkenyl sufosuccinic anhydrides, acids and alkali metal and amine salts thereof useful as surface active compounds.

The new compounds of our invention have the formulas

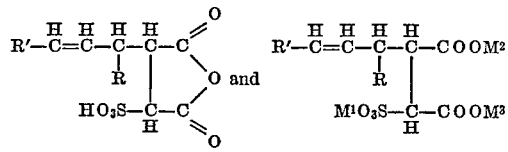

wherein $M^1$, $M^2$ and $M^3$ represent the same or different members of the group consisting of hydrogen, an alkali metal atom or an alkyl amine radical having 1 to 4 carbons in the alkyl group; R and R' represent hydrogen or alkyl groups of 1 to 14 carbon atoms, whose total number of carbon atoms is no more than 16.

Especially valuable are compounds within the scope of the above formulas wherein R and R' represent alkyl groups having a total of 9 carbon atoms, i.e. the dodecenyl sulfosuccinic anhydrides, acids and their salts.

Our new compounds are useful as surface tension reducing agents, as detergent bases, as emulsifying agents, and as soil antideposition agents when added to other detergents. They have the advantage over alkyl benzene sulfonic acid detergents in being readily biodegradable, since they contain no benzene ring whatever. The anhydrides and the acids are soluble in strong mineral acids which renders them useful as surface tension reducers in such media, and makes them especially useful in acidic metal plating baths.

The new alkenyl sulfosuccinic anhydrides of our invention can be prepared by sulfonating the corresponding alkenyl succinic anhydride with sulfur trioxide in an anhydrous solvent reaction medium which is inert to $SO_3$ and is stable at temperatures below the boiling point of the alkenyl succinic anhydride. The sulfonation proceeds as follows:

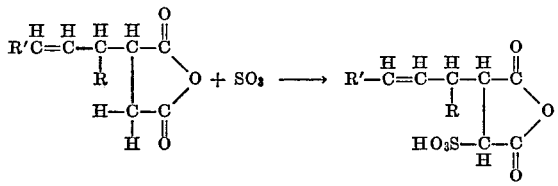

In carrying out the sulfonation reaction, the alkenyl succinic anhydride is dissolved in the anhydrous solvent reaction medium. Then liquid sulfur trioxide, dissolved in the same or a different anhydrous solvent, is added slowly to the alkenyl succinic anhydride solution. The sulfur trioxide is employed in ratio of at least about one mol, preferably 1.1 to 1.5 mols, per mol of alkenyl succinic anhydride. The mixture is agitated, while maintaining the temperature preferably between about $-5°$ C. and about $+35°$ C., until reaction is complete, usually a period between about 15 minutes and about 2 hours, thus producing the alkenyl sulfosuccinic anhydride. The resulting anhydride is then neutralized using sufficient aqueous base material to produce the mono-, di- or tri-alkali metal or amine salt of the alkenyl sulfosuccinic acid, as desired.

Use of an anhydrous solvent reaction medium inert to the action of sulfur trioxide is important to the sulfonation reaction. We prefer to use for this purpose hydrocarbons or halogenated hydrocarbons having boiling points between about $-10°$ C. and about $100°$ C. Preferably hydrocarbons of 1 to 7 carbon atoms or halogenated hydrocarbons of 1 to 7 carbon atoms whose halogens are chlorine or fluorine, for example the following

| Solvent | Formula | Approximate boiling point, °C. |
|---|---|---|
| Methylene chloride | $CH_2Cl_2$ | 98.2 |
| Trichloromonofluoromethane | $CCl_3F$ | 24 |
| Trichlorotrifluorethane | $C_2Cl_3F_3$ | 48 |
| Hexane | $C_6H_{14}$ | 69 |
| Heptane | $C_7H_{16}$ | 98.5 |

NOTE.—Liquid $SO_2$, B.P. $-10°$ C., can also be used.

The amount of reaction medium used is not unduly critical. However, it should be present in amounts at least sufficient to act as a dispersion medium for the reactants, for example, between about two parts and about five parts by weight per part by weight of alkenyl succinic anhydride charged.

The resulting alkenyl sulfosuccinic anhydrides and especially the acid, alkali metal or amine sulfonates, are excellent surface tension reducing agents. The surface tension reducing effects in water of the acid per se and also the alkali metal and amine salts are substantially similar to those of the standard alkyl benzene sulfonic acids, hence the new compounds are useful as surface tension reducing agents in aqueous solutions. The alkenyl sulfosuccinic anhydrides and the acids are virtually completely miscible with strong mineral acids such as sulfuric, hydrochloric and hydrofluoric acids and hence are valuable additives for acid plating baths, particularly in silver and copper plating, as aids in facilitating wetting of the metal to be plated by the acidic electrolyte. They thus fill a need not satisfied by the alkyl benzene sulfonic acids which are so sparingly acid soluble as to be ineffective for such use.

The following specific examples further illustrate our invention. Parts are by weight except as otherwise noted.

EXAMPLE 1

Dodecenyl succinic anhydride (mol wt. 266, B.P. about 316° C.) was sulfonated by first preparing a mixture of 133 parts (0.5 mol) of dodecenyl succinic anhydride and 265 parts of methylene chloride, the latter to function as an inert solvent reaction medium. The mixture was then placed in a reaction vessel equipped for agitation. The agitator was started and then a mixture of 44 parts (.55 mol) of stabilized liquid sulfur trioxide in 400 parts of methylene chloride was added to the first mixture slowly from a dropping funnel during a period of 32 minutes while agitating the mixture and maintaining its temperature between about 16° C. and about 19° C., during which sulfonation of the dodecenyl succinic anhydride occurred, producing dodecenyl sulfosuccinic acid anhydride. To the resulting mixture was added 44 parts (1.1 mol) of sodium hydroxide and 100 parts of water, whereby the acid was neutralized and converted into the disodium dodecenyl sulfosuccinate of the formula

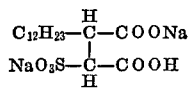

The neutralized mixture was transferred to a separatory funnel wherein a phase separation took place over a period of 18 hours into an upper organic sulfonate layer and a lower methylene chloride layer. The lower methylene chloride layer was drawn off and the upper layer product was freed from residual methylene chloride by evaporation under reduced pressure.

EXAMPLE 2

In a manner similar to that described in Example 1 dodecenyl succinic anhydride was sulfonated in methylene chloride solution with a slight molecular excess of stabilized $SO_3$. To the resulting mixture was added an excess of water thus forming dodecenyl sulfosuccinic acid of the formula

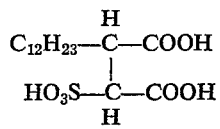

which was then allowed to stratify in a separatory funnel as an upper layer. The lower (methylene chloride) layer was drawn off and the upper acid layer was recovered as an aqueous solution.

EXAMPLES 3-5

Portions of the dodecenyl sulfosuccinic acid formed above were mixed respectively with one, two and three molecular equivalents of sodium hydroxide thus producing the mono-, di- and tri-sodium salts of dodecenyl sulfosuccinic acid respectively, of the formulas

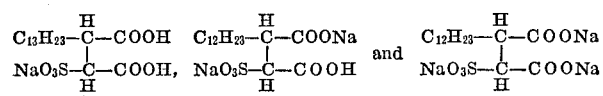

Similar results are obtained when potassium hydroxide or ammonium hydroxide or an alkyl amine is substituted for the sodium hydroxide used above.

EXAMPLE 6

A portion of the dodecenyl sulfosuccinic acid formed in Example 2 above was reacted with two molar equivalents of dimethylamine and one molar equivalent of sodium hydroxide thus producing the monosodium diamine salt of dodecenyl sulfosuccinic acid of the formula shown below.

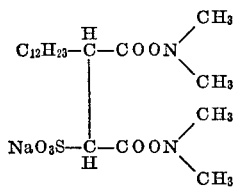

Similar results are obtained when other amines of the formula

wherein $R^2$ represents hydrogen or an alkyl group of 1 to 4 carbon atoms, $R^3$ represents an alkyl group of 1 to 4 carbon atoms, are used in place of the dimethyl amine used above.

EXAMPLE 7

The dodecenyl sulfosuccinic acid monosodium salt was tested for surface tension reducing properties in 0.1% solution in water and showed the value in dynes per centimeter at 25° C. as recorded in Table I below in direct comparison with water and a standard linear dodecyl benzene sulfonic acid sodium salt.

TABLE I

Surface tension of dodecenyl sulfosuccinic acid monosodium salt in 0.1% aqueous solution

|  | Dynes/cm. at 25° C. |
|---|---|
| Dodecenyl sulfosuccinic acid monosodium salt | 30.8 |
| Dodecylbenzene sodium sulfonate | 37.2 |
| Water | 71.97 |

Similar reductions in surface tension are produced by dodecenyl sulfosuccinic acid, by the di- and tri-sodium salts of dodecenyl sulfosuccinic acid and by the other alkenyl sulfosuccinic acids of the invention and their mono-, di- and tri-alkali metal and amine salts.

EXAMPLE 8

Dodecenyl sulfosuccinic acid (DSASA) and 97% sulfuric acid were mixed at ambient temperatures of about 25° C. in the proportions indicated below and their mutual solubilities noted as shown in Table II.

TABLE II

| Parts | | |
|---|---|---|
| 97% $H_2SO_4$ | DSASA | Solubility |
| 1 | 99 | Complete. |
| 5 | 95 | Do. |
| 10 | 90 | Do. |
| 25 | 75 | Do. |
| 50 | 50 | Do. |
| 75 | 25 | Do. |

It is apparent from Table II that dodecenyl sulfosuccinic acid is virtually completely miscible with concentrated sulfuric acid solution. Similiar miscibility is shown by mixtures of hydrochloric acid and hydrofluoric acid with dodecenyl sulfosuccinic acid and also with mineral acid solutions of lesser concentrations.

EXAMPLE 9

Portions of dodecenyl sulfosuccinic acid (DSASA) were dissolved in 97% sulfuric acid to produce solutions of .01%, 0.10% and 1.00% DSASA concentrations respectively, and the resulting solutions were measured for surface tension properties with the results shown in Table III below.

TABLE III

| Percent DSASA in 97% $H_2SO_4$: | Surface tension dynes/cm. at 27° C. |
|---|---|
| 0.00 | 60.3 |
| 0.01 | 59.9 |
| 0.10 | 55.1 |
| 1.00 | 43.7 |

It is apparent from Table III that the presence of even small proportions of dodecenyl sulfosuccinic acid in concentrated sulfuric acid reduces the surface tension of the resulting solution significantly.

We claim:
1. The alkenyl sulfosuccinic anhydrides, acids or salts thereof of the formulas

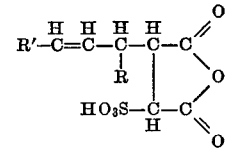
(I)
and

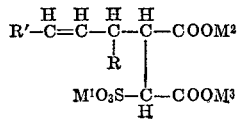
(II)

wherein $M^1$, $M^2$ and $M^3$ represent hydrogen, an alkali metal atom or an alkyl amine radical having 1 to 4 carbon atoms in the alkyl group; R and R' individually represent hydrogen or alkyl groups of 1 to 14 carbon atoms, and together represent groups having a total of no more than 16 carbon atoms.

2. The compounds of Formula I of claim 1 wherein R and R' represent groups having a total of 9 carbon atoms.

3. The compounds of Formula II of claim 1 wherein R and R' represent groups having a total of 9 carbon atoms.

4. The compounds of claim 3 wherein $M^1$, $M^2$ and $M^3$ all represent hydrogen.

5. The compounds of claim 3 wherein $M^2$ and $M^3$ represent hydrogen, $M^1$ represents a sodium atom.

6. The compounds of claim 3 wherein one member of $M^1$, $M^2$ and $M^3$ is hydrogen, the other two members are sodium atoms.

7. The compounds of claim 3 wherein $M^1$, $M^2$ and $M^3$ each represent a sodium atom.

8. The compounds of claim 3 wherein $M^2$ and $M^3$ represent dimethyl amine radicals, $M^1$ represents a sodium atom.

References Cited

UNITED STATES PATENTS 2,252,401　8/1941　Jaeger ---------- 260—513 R

ALEX MAZEL, Primary Examiner

B. DENTZ, Assistant Examiner

U.S. Cl. X.R.

260—501.15, 513; 148—6.24: 252—555